US012781065B2

(12) United States Patent
Matter et al.

(10) Patent No.: US 12,781,065 B2
(45) Date of Patent: Nov. 3, 2026

(54) RHEOLOGY-MODIFYING TRIURETHANE COMPOUND

(71) Applicant: COATEX, Genay (FR)

(72) Inventors: Yves Matter, Reyrieux (FR); Denis Ruhlmann, Genay (FR); Jean Marc Suau, Lucenay (FR)

(73) Assignee: COATEX, Genay (FR)

( * ) Notice: Subject to any disclaimer, the term of this patent is extended or adjusted under 35 U.S.C. 154(b) by 885 days.

(21) Appl. No.: 18/002,379

(22) PCT Filed: Jun. 29, 2021

(86) PCT No.: PCT/FR2021/000067
§ 371 (c)(1),
(2) Date: Dec. 19, 2022

(87) PCT Pub. No.: WO2022/003261
PCT Pub. Date: Jan. 6, 2022

(65) Prior Publication Data

US 2023/0265295 A1 Aug. 24, 2023

(30) Foreign Application Priority Data

Jun. 30, 2020 (FR) ....................................... 2006871

(51) Int. Cl.

| | |
|---|---|
| ***C09D 7/43*** | (2018.01) |
| ***C08G 18/22*** | (2006.01) |
| ***C08G 18/28*** | (2006.01) |
| ***C08G 18/78*** | (2006.01) |
| ***C09D 17/00*** | (2006.01) |

(52) U.S. Cl.
CPC ............. *C09D 7/43* (2018.01); *C08G 18/227* (2013.01); *C08G 18/283* (2013.01); *C08G 18/7831* (2013.01); *C08G 18/7893* (2013.01); *C09D 17/001* (2013.01)

(58) Field of Classification Search
CPC .... C08G 18/10; C08G 18/71; C08G 18/2805; C08G 18/283; C08G 18/4833; C08G 18/3206; C08G 18/674; C09D 7/43; C09D 7/44
See application file for complete search history.

(56) References Cited

U.S. PATENT DOCUMENTS

| | | | | |
|---|---|---|---|---|
| 4,180,491 A * | 12/1979 | Kim | C08G 18/71 524/391 |
| 5,023,309 A | 6/1991 | Kruse et al. | |

FOREIGN PATENT DOCUMENTS

| | | |
|---|---|---|
| CN | 109844041 A | 6/2019 |
| EP | 0 307 775 A2 | 3/1989 |
| EP | 0 761 779 A1 | 3/1997 |
| FR | 2 372 865 A1 | 6/1978 |

OTHER PUBLICATIONS

International Search Report mailed on Sep. 30, 2021 in PCT/FR2021/000067 filed on Jun. 29, 2021 (2 pages).
Combined Chinese Office Action and Search Report issued May 1, 2024 in corresponding Chinese Patent Application No. 202180044424.6 (English translation only), 8 pages.

* cited by examiner

*Primary Examiner* — Christopher M Rodd
(74) *Attorney, Agent, or Firm* — Oblon, McClelland, Maier & Neustadt, L.L.P.

(57) ABSTRACT

A triurethane compound may be used to modify rheology. An aqueous composition may include such a triurethane compound and the viscosity of an aqueous composition may be controlled using the triurethane compound.

20 Claims, No Drawings

RHEOLOGY-MODIFYING TRIURETHANE COMPOUND

CROSS-REFERENCE TO RELATED APPLICATIONS

The present application is the national stage of international application PCT/FR2021/00006, filed on Jun. 29, 2021, and claims the benefit of the filing date of French Appl. No. 2006871, filed on Jun. 30, 2020.

BACKGROUND OF THE INVENTION

Field of the Invention

The invention relates to a rheology-modifying triurethane compound. The invention also provides an aqueous composition comprising a triurethane compound of the invention and a method for controlling the viscosity of an aqueous composition using the triurethane compound of the invention.

Description of the Related Art

In general, for aqueous coating compositions, and in particular for aqueous paint or varnish compositions, it is necessary to control the viscosity both for low or medium shear gradients and for high shear gradients. Indeed, during its preparation, storage, application or drying, a paint formulation is subjected to numerous stresses requiring particularly complex rheological properties.

When paint is stored, the pigment particles tend to settle by gravity. Stabilizing the dispersion of these pigment particles therefore requires a paint formulation having high viscosity at very low shear gradients corresponding to the limiting velocity of the particles.

Paint uptake is the amount of paint taken up by an application tool such as a paintbrush, a brush or a roller. If the tool takes up a large amount of paint when dipped into and removed from the can, it will not need to be dipped as often. Paint uptake increases as the viscosity increases. The calculation of the equivalent shear gradient is a function of the paint flow velocity for a particular thickness of paint on the tool. The paint formulation should therefore also have a high viscosity at low or medium shear gradients.

Moreover, the paint must have a high filling property so that, when applied to a substrate, a thick coat of paint is deposited at each stroke. A high filling property therefore makes it possible to obtain a thicker wet film of paint with each stroke of the tool. The paint formulation must therefore have a high viscosity at high shear gradients.

High viscosity at high shear gradients will also reduce or eliminate the risk of splattering or dripping when the paint is being applied.

Reduced viscosity at low or medium shear gradients will also result in a neat, taut appearance after the paint has been applied, particularly a single-coat paint, to a substrate which will then have a very even surface finish having no bumps or indentations. The final visual appearance of the dry coat is thus greatly improved.

Furthermore, once the paint has been applied to a surface, especially a vertical surface, it should not run. The paint formulation thus needs to have a high viscosity at low and medium shear gradients. Lastly, once the paint has been applied to a surface, it should have a high levelling capacity. The paint formulation must then have a reduced viscosity at low and medium shear gradients.

HEUR (hydrophobically modified ethoxylated urethane)-type compounds are known as rheology-modifying agents. Document EP0307775 discloses thickening polyurethane compounds of paint compositions that are prepared from diisocyanate compounds. Document FR2372865 describes compositions of surfactants and of polyurethanes for thickening textile printing pulp.

BRIEF SUMMARY OF THE INVENTION

However, the known HEUR-type compounds do not always make it possible to provide a satisfactory solution. In particular, the rheology-modifying compounds of the prior art do not always allow for effective viscosity control or do not always achieve a satisfactory improvement in the compromise between Stormer viscosity (measured at low or medium shear gradients and expressed in KUs) and ICI viscosity (measured at high or very high shear gradients and expressed in s-1). In particular, the known rheology-modifying compounds do not always make it possible to increase the ICI viscosity/Stormer viscosity ratio. There is therefore a need for improved rheology-modifying agents. The triurethane compound according to the invention makes it possible to provide a solution to all or part of the problems of the rheology-modifying agents in the prior art. Thus, the invention provides a triurethane compound T prepared by reacting:

a. one molar equivalent of at least one polyisocyanate compound (a) comprising on average three isocyanate groups and
b. one molar equivalent of at least one polyalkoxylated compound (b) chosen among:
    - the straight aliphatic monoalcohols (b1), comprising from 6 to 40 carbon atoms, that are polyalkoxylated,
    - the branched aliphatic monoalcohols (b2), comprising from 6 to 40 carbon atoms, that are polyalkoxylated,
    - the cycloaliphatic monoalcohols (b3), comprising from 6 to 40 carbon atoms, that are polyalkoxylated,
    - the monoaromatic monoalcohols (b4), comprising from 6 to 30 polyalkoxylated carbon atoms, that are polyalkoxylated,
    - the polyaromatic monoalcohols (b5), comprising from 10 to 80 carbon atoms, that are polyalkoxylated, and
c. two molar equivalents of at least two identical or different compounds (c), chosen among:
    - the straight aliphatic monoalcohols (c1), comprising from 6 to 40 carbon atoms, that are polyalkoxylated,
    - the branched aliphatic monoalcohols (c2), comprising from 6 to 40 carbon atoms, that are poly alkoxylated,
    - the cycloaliphatic monoalcohols (c3), comprising from 6 to 40 carbon atoms, that are polyalkoxylated,
    - the monoaromatic monoalcohols (c4), comprising from 6 to 30 carbon atoms, that are polyalkoxylated,
    - the polyaromatic monoalcohols (c5), comprising from 10 to 80 carbon atoms, that are polyalkoxylated,
    - the straight aliphatic monoalcohols (c6), comprising from 6 to 40 carbon atoms, that are non-alkoxylated,
    - the branched aliphatic monoalcohols (c7), comprising from 6 to 40 carbon atoms, that are non-alkoxylated,
    - the cycloaliphatic monoalcohols (c8), comprising from 6 to 40 carbon atoms, that are non-alkoxylated,
    - the monoaromatic monoalcohols (c9), comprising from 6 to 30 carbon atoms, that are non-alkoxylated,
    - the polyaromatic monoalcohols (c0), comprising from 10 to 80 carbon atoms, that are non-alkoxylated.

DETAILED DESCRIPTION OF THE INVENTION

Essentially according to the invention, the triurethane compound T is prepared from at least one compound (a) comprising three isocyanate groups and from at least one, two or three compounds (b) capable of reacting with these isocyanate groups and comprising a saturated, unsaturated or aromatic hydrocarbon chain combined with a poly alkoxylated chain. Preferably according to the invention, this reagent compound is a monohydroxyl compound. In addition to the triurethane compound T, the invention also provides several other particular triurethane compounds that share these essential characteristics with the compound T according to the invention. These triurethane compounds Ta, Tb and Tc according to the invention thus respectively comprise three, two or one polyalkoxylated chain(s).

The invention therefore provides a triurethane compound Ta comprising three polyalkoxylated chains. The triurethane compound Ta according to the invention is prepared by reacting:

a. one molar equivalent of at least one triisocyanate compound (a) and
b. one molar equivalent of at least one polyalkoxylated compound (b) chosen among:
   - the straight aliphatic monoalcohols (b1), comprising from 6 to 40 carbon atoms, that are polyalkoxylated,
   - the branched aliphatic monoalcohols (b2), comprising from 6 to 40 carbon atoms, that are polyalkoxylated,
   - the cycloaliphatic monoalcohols (b3), comprising from 6 to 40 carbon atoms, that are polyalkoxylated,
   - the monoaromatic monoalcohols (b4), comprising from 6 to 30 carbon atoms, that are poly alkoxylated,
   - the polyaromatic monoalcohols (b5), comprising from 10 to 80 carbon atoms, that are polyalkoxylated, and
c. two molar equivalents of at least one identical or different polyalkoxylated compound (c), chosen among:
   - the straight aliphatic monoalcohols (c1), comprising from 6 to 40 carbon atoms, that are polyalkoxylated,
   - the branched aliphatic monoalcohols (c2), comprising from 6 to 40 carbon atoms, that are polyalkoxylated,
   - the cycloaliphatic monoalcohols (c3), comprising from 6 to 40 carbon atoms, that are polyalkoxylated,
   - the monoaromatic monoalcohols (c4), comprising from 6 to 30 carbon atoms, that are polyalkoxylated,
   - the polyaromatic monoalcohols (c5), comprising from 10 to 80 carbon atoms, that are polyalkoxylated.

Preferably according to the invention, the straight poly-alkoxylated aliphatic monoalcohols (b1) used to prepare the triurethane compound Ta comprise from 80 to 500 alkoxy groups. Also preferably according to the invention, the monoaromatic polyalkoxylated alcohols (b4) used to prepare the triurethane compound Ta comprise from 6 to 12 carbon atoms or comprise from 22 to 30 carbon atoms.

The invention therefore further provides a triurethane compound Tb comprising two polyalkoxylated chains and one non-alkoxylated chain. The triurethane compound Tb according to the invention is prepared by reacting:

a. one molar equivalent of at least one triisocyanate compound (a) and
b. one molar equivalent of at least one polyalkoxylated compound (b) chosen among:
   - the straight aliphatic monoalcohols (b1), comprising from 6 to 40 carbon atoms, that are polyalkoxylated,
   - the branched aliphatic monoalcohols (b2), comprising from 6 to 40 carbon atoms, that are polyalkoxylated,
   - the cycloaliphatic monoalcohols (b3), comprising from 6 to 40 carbon atoms, that are polyalkoxylated,
   - the monoaromatic monoalcohols (b4), comprising from 6 to 30 carbon atoms, that are poly alkoxylated,
   - the polyaromatic monoalcohols (b5), comprising from 10 to 80 carbon atoms, that are polyalkoxylated,
c. one molar equivalent of at least one identical or different polyalkoxylated compound (c), chosen among:
   - the straight aliphatic monoalcohols (c1), comprising from 6 to 40 carbon atoms, that are polyalkoxylated,
   - the branched aliphatic monoalcohols (c2), comprising from 6 to 40 carbon atoms, that are polyalkoxylated,
   - the cycloaliphatic monoalcohols (c3), comprising from 6 to 40 carbon atoms, that are polyalkoxylated,
   - the monoaromatic monoalcohols (c4), comprising from 6 to 30 carbon atoms, that are polyalkoxylated,
   - the polyaromatic monoalcohols (c5), comprising from 10 to 80 carbon atoms, that are polyalkoxylated, and one molar equivalent of at least one identical or different non-alkoxylated compound (c), chosen among:
   - the straight aliphatic monoalcohols (c6), comprising from 6 to 40 carbon atoms, that are non-alkoxylated,
   - the branched aliphatic monoalcohols (c7), comprising from 6 to 40 carbon atoms, that are non-alkoxylated,
   - the cycloaliphatic monoalcohols (c8), comprising from 6 to 40 carbon atoms, that are non-alkoxylated,
   - the monoaromatic monoalcohols (c9), comprising from 6 to 30 carbon atoms, that are non-alkoxylated,
   - the polyaromatic monoalcohols (c10), comprising from 10 to 80 carbon atoms, that are non-alkoxylated.

Preferably according to the invention, the straight non-alkoxylated aliphatic monoalcohols (c6) used to prepare the triurethane compound Tb comprise from 16 to 40 carbon atoms.

The invention therefore further provides a triurethane compound Tc comprising one polyalkoxylated chain and two non-alkoxylated chains. The triurethane compound Tc according to the invention is prepared by reacting:

a. one molar equivalent of at least one triisocyanate compound (a) and
b. one molar equivalent of at least one identical or different polyalkoxylated compound (b), chosen among:
   - the straight aliphatic monoalcohols (b1), comprising from 6 to 40 carbon atoms, that are poly alkoxylated,
   - the branched aliphatic monoalcohols (b2), comprising from 6 to 40 carbon atoms, that are polyalkoxylated,
   - the cycloaliphatic monoalcohols (b3), comprising from 6 to 40 carbon atoms, that are polyalkoxylated,
   - the monoaromatic monoalcohols (b4), comprising from 6 to 30 carbon atoms, that are polyalkoxylated,
   - the polyaromatic monoalcohols (b5), comprising from 10 to 80 carbon atoms, that are polyalkoxylated, and
c. two molar equivalents of at least one identical or different non-alkoxylated compound (c), chosen among:
   - the straight aliphatic monoalcohols (c6), comprising from 6 to 40 carbon atoms, that are non-alkoxylated,
   - the branched aliphatic monoalcohols (c7), comprising from 6 to 40 carbon atoms, that are non-alkoxylated,
   - the cycloaliphatic monoalcohols (c8), comprising from 6 to 40 carbon atoms, that are non-alkoxylated,
   - the monoaromatic monoalcohols (c9), comprising from 6 to 30 carbon atoms, that are non-alkoxylated,
   - the polvaromatic monoalcohols (c10), comprising from 10 to 80 carbon atoms, that are non-alkoxylated.

According to the invention, the monoalcohols used in the preparation of the triurethane compounds according to the invention comprise a hydrocarbon group. The number of carbon atoms defining these monoalcohols corresponds to the carbon atoms in these hydrocarbon groups and does not include the carbon atoms in the alkoxy groups.

Preferably according to the invention, the condensation of compounds a, b and c is carried out in the presence of a catalyst. This catalyst can be chosen among an amine, preferably 1,8-diazabicyclo[5.4.0]undec-7-ene (DBU), a derivative of a metal chosen among Al, Bi, Sn, Hg, Pb, Mn, Zn, Zr, Ti. Traces of water may also participate in the catalysis of the reaction. As examples of metal derivatives, a derivative is preferably chosen among dibutyl bismuth dilaurate, dibutyl bismuth diacetate, dibutyl bismuth oxide, bismuth carboxylate, dibutyltin dilaurate, dibutyltin diacetate, dibutyltin oxide, a mercury derivative, a lead derivative, zinc salts, manganese salts, a compound comprising chelated zirconium, a compound comprising chelated aluminium. The preferred metal derivative is chosen among a Bi derivative, an Sn derivative and a Ti derivative.

Preferably according to the invention, the reaction uses a single compound (a) or the reaction uses two or three different compounds (a). According to the invention, the polyisocyanate compound (a) comprises on average three isocyanate groups. Generally, the polyisocyanate compound (a) comprises on average 3±10% molar isocyanate groups. Preferably according to the invention, compound (a) is chosen among: triphenylmethane-4,4',4"-triisocyanate or 1,1',1"-methylidynetris (4-isocyanatobenzene);

an isocyanurate compound, in particular an isocyanurate compound derived from a compound chosen among:
the symmetric aromatic diisocyanate compounds, preferably:
2,2'-diphenylmethylene diisocyanate (2,2'-MDI) and 4,4'-diphenylmethylene diisocyanate (4,4'-MDI);
4,4'-dibenzyl diisocyanate (4,4'-DBDI);
2,6-toluene diisocyanate (2,6-TDI);
m-xylylene diisocyanate (m-XDI);
the symmetric alicyclic diisocyanate compounds, preferably methylene bis(4-cyclohexylisocyanate) ($H_{12}MDI$);
the symmetric aliphatic diisocyanate compounds, preferably hexamethylene diisocyanate (HDI), pentamethylene diisocyanate (PDI);
the asymmetric aromatic diisocyanate compounds, preferably:
2,4'-diphenylmethylene diisocyanate (2,4'-MDI);
2,4'-dibenzyl diisocyanate (2,4'-DBDI);
2,4-toluene diisocyanate (2,4-TDI);

a biuret trimer compound, in particular a biuret trimer compound derived from a compound chosen among:
the symmetric aromatic diisocyanate compounds, preferably:
2,2'-diphenylmethylene diisocyanate (2,2'-MDI) and 4,4'-diphenylmethylene diisocyanate (4,4'-MDI);
4,4'-dibenzyl diisocyanate (4,4'-DBDI);
2,6-toluene diisocyanate (2,6-TDI);
m-xylylene diisocyanate (m-XDI);
the symmetric alicyclic diisocyanate compounds, preferably methylene bis(4-cyclohexylisocyanate) (H12MDI);
the symmetric aliphatic diisocyanate compounds, preferably hexamethylene diisocyanate (HDI), pentamethylene diisocyanate (PDI);
the asymmetric aromatic diisocyanate compounds, preferably:
2,4'-diphenylmethylene diisocyanate (2,4'-MDI);
2,4'-dibenzyl diisocyanate (2,4'-DBDI);
2,4-toluene diisocyanate (2,4-TDI).

Preferably according to the invention, compound (a) is chosen among triphenylmethane-4,4',4"-triisocyanate, 1,1',1"-methylidynetris (4-isocyanatobenzene), an HDI isocyanurate, an IPDI isocyanurate, a PDT isocyanurate, an HDI biuret trimer, an IPDI biuret trimer, a PDI biuret trimer and combinations thereof.

According to the invention, the monoalcohols are compounds comprising a single hydroxyl (OH) group that is terminal. According to the invention, the polyalkoxylated monoalcohols are compounds comprising a hydrocarbon chain that comprises several alkoxy groups and a terminal hydroxyl (OH) group. According to the invention, the polyalkoxylated monoalcohols are compounds of formula $R\text{-}(LO)_n\text{—}H$ in which R represents a hydrocarbon chain, n represents the number of polyalkoxylations and L, identical or different, independently represents a straight or branched alkylene group comprising from 1 to 4 carbon atoms. According to the invention, the non-alkoxylated monoalcohols are compounds comprising a hydrocarbon chain and a single hydroxyl (OH) group that is terminal. According to the invention, the non-alkoxylated monoalcohols are compounds of formula R'—OH in which R' represents a hydrocarbon chain. Preferably according to the invention, the polyalkoxylated monoalcohols comprise from 2 to 500 alkoxy groups, preferably from 80 to 400 alkoxy groups or from 100 to 200 alkoxy groups. Also preferably according to the invention, the alkoxy groups are chosen among oxyethylene ($\text{—}CH_2CH_2O\text{—}$), oxypropylene ($\text{—}CH_2CH(CH_3)O\text{—}$ or $\text{—}CH(CH_3)CH_2O\text{—}$), oxybutylene ($\text{—}CH(CH_2CH_3)CH_2O\text{—}$ or $\text{—}CH_2CH(CH_2CH_3)O\text{—}$) and combinations thereof. More preferably, the alkoxy groups are oxyethylene groups alone or combined with oxypropylene groups; in particular the molar amount of oxypropylene groups is comprised between 1 and 30%. Much more preferably, the alkoxy groups are oxyethylene groups.

Essentially according to the invention, compounds T. Ta, Tb and Tc are compounds comprising alkoxy groups. Preferentially according to the invention, compounds T, Ta, Tb and Tc have a degree of polyalkoxylation comprised between 100 and 500 or between 100 and 502. The degree of poly alkoxylation defines the number of alkoxy groups included in these compounds, in particular of oxyethylene, oxypropylene or oxybutylene groups.

Preferably according to the invention, compound (b) is such that:

the hydrocarbon chain of monoalcohol (b1) comprises from 6 to 30 carbon atoms, preferably from 6 to 20 carbon atoms or from 8 to 16 carbon atoms, more preferentially monoalcohol (b1) is chosen among polyalkoxylated n-octanol, polyalkoxylated n-decanol, polyalkoxylated n-dodecanol, polyalkoxylated n-hexadecanol, or the hydrocarbon chain of monoalcohol (b2) comprises from 6 to 30 carbon atoms, preferably from 6 to 20 carbon atoms or from 8 to 16 carbon atoms, more preferentially, monoalcohol (b2) is chosen among polyalkoxylated ethylhexanol, polyalkoxylated isooctanol, polyalkoxylated isononanol, polyalkoxylated isodecanol, polyalkoxylated propyl heptanol, polyalkoxylated butyl octanol, polyalkoxylated isododecanol, polyalkoxylated isohexadecanol, a polyalkoxylated oxo alcohol, a polyalkoxylated Guerbet alcohol, or the hydrocarbon chain of monoalcohol (b3) comprises from 6 to 30 carbon atoms, preferably from 6 to 20 carbon atoms or from 8 to 20 carbon atoms, more preferentially monoalcohol (b3) is chosen among polyalkoxylated ethylcyclohexanol, polyalkoxylated n-nonyl-cyclohexanol, polyalkoxylated n-dodecyl-cyclohexanol, or the hydrocarbon chain of monoalcohol (b4) comprises from 12 to 30 carbon atoms or from 12 to 22 carbon atoms, preferably monoalcohol (b4) is chosen among poly alkoxylated n-pentadecyl-phenol, or the hydrocarbon chain of monoalcohol (b5) comprises from 10 to 60 carbon atoms, preferably monoalcohol (b5) is chosen among polyalkoxylated naphthol, polyalkoxylated distyryl phenol, polyalkoxylated tristyryl phenol, polyalkoxylated pentastyryl cumyl phenol.

More preferably according to the invention, the hydrocarbon chain of monoalcohol (b4) of triurethanes Tb or Tc comprises from 12 to 30 carbon atoms or from 12 to 22 carbon atoms, preferably monoalcohol (b4) is chosen among polyalkoxylated n-pentadecyl-phenol.

Preferably according to the invention, compound (c) is such that:

the hydrocarbon chain of monoalcohol (c1) comprises from 6 to 30 carbon atoms, preferably from 6 to 20 carbon atoms or from 8 to 16 carbon atoms, more preferentially monoalcohol (c1) is chosen among polyalkoxylated n-octanol, polyalkoxylated n-decanol, polyalkoxylated n-dodecanol, polyalkoxylated n-hexadecanol, or the hydrocarbon chain of monoalcohol (c2) comprises from 6 to 30 carbon atoms, preferably from 6 to 20 carbon atoms or from 8 to 16 carbon atoms, more preferentially, monoalcohol (c2) is chosen among polyalkoxylated ethylhexanol, polyalkoxylated isooctanol, polyalkoxylated isononanol, polyalkoxylated isodecanol, polyalkoxylated propyl heptanol, polyalkoxylated butyl octanol, polyalkoxylated isododecanol, polyalkoxylated isohexadecanol, a polyalkoxylated oxo alcohol, a polyalkoxylated Guerbet alcohol, or the hydrocarbon chain of monoalcohol (c3) comprises from 6 to 30 carbon atoms, preferably from 6 to 20 carbon atoms or from 8 to 20 carbon atoms, more preferentially monoalcohol (c3) is chosen among polyalkoxylated ethylcyclohexanol, polyalkoxylated n-nonyl-cyclohexanol, polyalkoxylated n-dodecyl-cyclohexanol, or the hydrocarbon chain of monoalcohol (c4) comprises from 12 to 30 carbon atoms or from 12 to 22 carbon atoms, preferably monoalcohol (c4) is chosen among polyalkoxylated n-pentadecyl-phenol or the hydrocarbon chain of monoalcohol (c5) comprises from 10 to 60 carbon atoms, preferably monoalcohol (c5) is chosen among polyalkoxylated naphthol, polyalkoxylated distyryl phenol, polyalkoxylated tristyryl phenol, polyalkoxylated pentastyryl cumyl phenol, the hydrocarbon chain of monoalcohol (c6) comprises from 6 to 30 carbon atoms, preferably from 6 to 20 carbon atoms or from 8 to 16 carbon atoms, more preferentially monoalcohol (c6) is chosen among non-alkoxylated n-octanol, non-alkoxylated n-decanol, non-alkoxylated n-dodecanol, non-alkoxylated n-hexadecanol, or the hydrocarbon chain of monoalcohol (c7) comprises from 6 to 30 carbon atoms, preferably from 6 to 20 carbon atoms or from 8 to 16 carbon atoms, more preferentially, monoalcohol (c7) is chosen among non-alkoxylated ethylhexanol, non-alkoxylated isooctanol, non-alkoxylated isononanol, non-alkoxylated isodecanol, non-alkoxylated propyl heptanol, non-alkoxylated butyl octanol, non-alkoxylated isododecanol, non-alkoxylated isohexadecanol, a non-alkoxylated oxo alcohol, a non-alkoxylated Guerbet alcohol, or the hydrocarbon chain of monoalcohol (c8) comprises from 6 to 30 carbon atoms, preferably from 6 to 20 carbon atoms or from 8 to 20 carbon atoms, more preferentially monoalcohol (c8) is chosen among non-alkoxylated ethylcyclohexanol, non-alkoxylated n-nonyl-cyclohexanol, non-alkoxylated n-dodecyl-cyclohexanol, or the hydrocarbon chain of monoalcohol (c9) comprises from 12 to 30 carbon atoms or from 12 to 22 carbon atoms, preferably monoalcohol (c9) is chosen among non-alkoxylated n-pentadecyl-phenol, or the hydrocarbon chain of monoalcohol (c10) comprises from 10 to 60 carbon atoms, preferably monoalcohol (c10) is chosen among non-alkoxylated naphthol, non-alkoxylated distyryl phenol, non-alkoxylated tristyryl phenol, non-alkoxylated pentastyryl cumyl phenol. More preferably according to the invention, the hydrocarbon chain of monoalcohol (c6) of the tiurethanes Ta or Tc comprises from 6 to 30 carbon atoms, preferably from 6 to 20 carbon atoms or from 8 to 16 carbon atoms, more preferentially monoalcohol (c6) is chosen among non-alkoxylated n-octanol, non-alkoxylated n-decanol, non-alkoxylated n-dodecanol, non-alkoxylated n-hexadecanol.

The invention therefore relates to compounds T, Ta, Tb and Tc, excluding triurethane compounds derived from the condensation of one molar equivalent of triisocyanate (toluene diisocyanate-trimethylolpropane, marketed as Mondur CB-75, or 1,6-hexamethylene diisocyanate trimer, marketed as Desmodur N) and of three molar equivalents of an aliphatic monoalcohol comprising an n-$C_{12}H_{25}$-alkyl group and 55 ethoxylations, triurethane compounds derived from the condensation of one molar equivalent of trnisocyanate (toluene diisocyanate-trimethylolpropane, marketed as Mondur CB-75, or 1,6-hexamethylene diisocyanate trimer, marketed as Desmodur N) and of three molar equivalents of an aromatic monoalcohol comprising a t-octyl-phenyl group and 166 ethoxylations, triurethane compounds derived from the condensation of one molar equivalent of triisocyanate (toluene diisocyanate-trimethylolpropane, marketed as Mondur CB-75, or 1,6-hexamethylene diisocyanate trimer, marketed as Desmodur N), of two molar equivalents of an aliphatic monoalcohol comprising an n-$C_8H_{17}$-alkyl group and 162 ethoxylations and of one molar equivalent of a non-alkoxylated aliphatic monoalcohol comprising an n-$C_8H_{17}$-alkyl group, triurethane compounds derived from the condensation of one molar equivalent of triisocyanate (toluene diisocyanate-trimethylolpropane, marketed as Mondur CB-75, or 1,6-hexamethylene diisocyanate trimer, marketed as Desmodur N), of two molar equivalents of an aliphatic monoalcohol comprising an n-$C_{12}H_{25}$-alkyl group and 162 ethoxylations and of one molar equivalent of a non-alkoxylated aliphatic monoalcohol comprising an n-$C_{12}H_{25}$-alkyl group, triurethane compounds derived from the condensation of one molar equivalent of triisocyanate (toluene diisocyanate-trimethylolpropane, marketed as Mondur CB-75, or 1,6-hexamethylene diisocyanate trimer, marketed as Desmodur N) and of three molar equivalents of an aromatic monoalcohol comprising a $C_{12}$-phenyl group and 135 ethoxylations.

In addition to a triurethane compound T, the invention also relates to a method for preparing this compound. Thus, the invention provides a method for preparing a triurethane compound T by reacting:

a. one molar equivalent of at least one polyisocyanate compound (a) comprising on average three isocyanate groups and
b. one molar equivalent of at least one polyalkoxylated compound (b) chosen among:
   - the straight aliphatic monoalcohols (b1), comprising from 6 to 40 carbon atoms, that are polyalkoxylated,
   - the branched aliphatic monoalcohols (b2), comprising from 6 to 40 carbon atoms, that are poly alkoxylated,
   - the cycloaliphatic monoalcohols (b3), comprising from 6 to 40 carbon atoms, that are polyalkoxylated,
   - the monoaromatic monoalcohols (b4), comprising from 6 to 30 carbon atoms, that are polyalkoxylated,
   - the polyaromatic monoalcohols (b5), comprising from 10 to 80 polyalkoxylated carbon atoms, that are polyalkoxylated, and
c. two molar equivalents of at least two identical or different compounds (c), chosen among:
   - the straight aliphatic monoalcohols (c1), comprising from 6 to 40 carbon atoms, that are polyalkoxylated,
   - the branched aliphatic monoalcohols (c2), comprising from 6 to 40 carbon atoms, that are poly alkoxylated,
   - the cycloaliphatic monoalcohols (c3), comprising from 6 to 40 carbon atoms, that are polyalkoxylated,
   - the monoaromatic monoalcohols (c4), comprising from 6 to 30 carbon atoms, that are polyalkoxylated,
   - the polyaromatic monoalcohols (c5), comprising from 10 to 80 carbon atoms, that are polyalkoxylated,
   - the straight aliphatic monoalcohols (c6), comprising from 6 to 40 carbon atoms, that are non-alkoxylated,
   - the branched aliphatic monoalcohols (c7), comprising from 6 to 40 carbon atoms, that are non-alkoxylated,
   - the cycloaliphatic monoalcohols (c8), comprising from 6 to 40 carbon atoms, that are non-alkoxylated,
   - the monoaromatic monoalcohols (c9), comprising from 6 to 30 carbon atoms, that are non-alkoxylated,
   - the polyaromatic monoalcohols (c0), comprising from 10 to 80 carbon atoms, that are non-alkoxylated.

Similarly, the invention provides the methods for respectively preparing the preferred triurethane T compounds according to the invention or for preparing the triurethane compounds Ta, Tb, and Tc according to the invention.

Preferably according to the invention for the preparation method according to the invention, the condensation of compounds a, b and c is carried out in the presence of a catalyst. More preferably, the reaction is catalyzed using an amine, preferably using 1,8-diazabicyclo[5.4.0]undec-7-ene (DBU), or at least one derivative of a metal chosen among Al, Bi, Sn. Hg, Pb, Mn, Zn, Zr, Ti. Traces of water may also participate in the catalysis of the reaction. As examples of metal derivatives, a derivative is preferably chosen among dibutyl bismuth dilaurate, dibutyl bismuth diacetate, dibutyl bismuth oxide, bismuth carboxylate, dibutyltin dilaurate, dibutyltin diacetate, dibutyltin oxide, a mercury derivative, a lead derivative, zinc salts, manganese salts, a compound comprising chelated zirconium, a compound comprising chelated aluminum. The preferred metal derivative is chosen among a Bi derivative, an Sn derivative and a Ti derivative.

Advantageously according to the invention, the condensation of compounds a, b and c is carried out in an organic solvent. The preferred organic solvents are solvents that are non-reactant with the isocyanate groups of compound a, in particular the solvents chosen among the hydrocarbon solvents (particularly $C_8$ to $C_{30}$ petroleum cuts), the aromatic solvents (particularly toluene and its derivatives) and combinations thereof. More preferably according to the invention, condensation is carried out directly with the different reagents or is carried out in toluene.

At the end of the preparation of the compound T according to the invention, a solution of the compound in an organic solvent is obtained. Such a solution can be used directly. Also according to the invention, the organic solvent can be separated and the compound T dried. Such a compound T according to the invention, which is dried, can then be used in solid form, for example in powder or pellet form.

In addition to the triurethane compounds T, Ta, Tb and Tc and a method for preparing these compounds, the invention also relates to an aqueous composition comprising at least one triurethane compound according to the invention. The invention also relates to an aqueous composition comprising at least one triurethane compound prepared according to the preparation method according to the invention.

Advantageously, the urethane compound according to the invention is a compound that is hydrophilic in nature. It can be formulated in an aqueous medium.

The aqueous composition according to the invention may also comprise at least one additive, in particular an additive chosen among:

- an amphiphilic compound, in particular a surfactant compound, preferably a hydroxylated surfactant compound, for example alkyl-polyalkylene glycol, in particular alkyl-polyethylene glycol and alkyl-polypropylene glycol;
- a polysaccharide derivative, for example cyclodextrin, cyclodextrin derivative, polyethers, alkyl-glucosides;
- solvents, in particular coalescing solvents, and hydrotropic compounds, for example glycol, butyl glycol, butyldiglycol, monopropylene glycol, ethylene glycol, ethylenediglycol, Dowanol products having CAS number 34590-94-8, Texanol products having CAS number 25265-77-4;
- anti-foaming agents, biocide agents.

The invention also provides an aqueous formulation that can be used in many technical fields. The aqueous formulation according to the invention comprises at least one composition according to the invention and may comprise at least one organic or mineral pigment or organic, organometallic or mineral particles, for example calcium carbonate, talc, kaolin, mica, silicates, silica, metal oxides, in particular titanium dioxide, iron oxides. The aqueous formulation according to the invention can also comprise at least one agent chosen among a particle-spacer agent, a dispersing agent, a stabilizing steric agent, an electrostatic stabilizer, an opacifying agent, a solvent, a coalescing agent, an anti-foaming agent, a preservative agent, a biocide agent, a spreading agent, a thickening agent, a film-forming copolymer, and mixtures thereof.

Depending on the particular urethane compound or the additives that it comprises, the formulation according to the invention can be used in many technical fields. Thus, the formulation according to the invention can be a coating formulation. Preferably, the formulation according to the invention is an ink formulation, a binder formulation, a varish formulation, a paint formulation, for example a decorative paint or an industrial paint. Preferably, the formulation according to the invention is a paint formulation.

The invention also provides a concentrated, water-based pigment pulp comprising at least one urethane compound obtained according to the invention and at least one colored organic or mineral pigment.

The triurethane compound according to the invention has properties that make it possible to use it to modify or control the rheology of the medium comprising it. Thus, the invention also provides a method for controlling the viscosity of an aqueous composition. This viscosity control method according to the invention comprises the addition of at least one triurethane compound according to the invention to an aqueous composition. This viscosity control method may also include the addition of at least one triurethane compound prepared according to the preparation method according to the invention.

Preferably, the viscosity control method according to the invention is carried out using an aqueous composition according to the invention. Also preferably, the viscosity control method according to the invention is carried out using an aqueous formulation according to the invention.

The particular, advantageous or preferred characteristics of the triurethane compound T according to the invention define aqueous compositions according to the invention, formulations according to the invention, pigment pulp and viscosity control methods which are also particular, advantageous or preferred.

The following examples illustrate the various aspects of the invention.

Example 1: Preparation of Urethane Compounds According to the Invention

Example 1-1: Preparation of a Compound Ta1 According to the Invention

In a 3 L glass reactor equipped with a mechanical stirring rod, a vacuum pump, and a nitrogen inlet and heated by means of a double jacket in which oil circulates, 450.3 g of a dodecanol/tetradecanol blend ethoxylated with 140 mol of ethylene oxide (MM=6,355 Da) is introduced and heated to 90° C. in an inert atmosphere. This product is dehydrated.

Under stirring and in an inert atmosphere, 12.97 g of HDI isocyanurate (mean MM=549 g/mol) is then added in one hour in the presence of 200 ppm of a bismuth carboxylate catalyst. When the addition is complete, the reaction mixture is left to stir for 60 minutes at 90° C.±1° C. Then, the absence of isocyanate is checked by back titration. 1 g is collected from the reaction medium to which an excess of dibutylamine (1 mol, for example) is added, which reacts with any isocyanate groups that may be present in the medium. Any unreacted dibutylamine is then assayed with hydrochloric acid (1 N, for example). The number of isocyanate groups present in the reaction medium can then be deduced. If this number is not zero, the reaction is continued for 15-minute periods until the reaction is completed. When the level reaches zero, the triurethane compound Ta1 is formulated using a surfactant compound such as ethoxylated alcohol (ethoxylated n-octanol with ten ethylene oxide equivalents), 1,000 ppm of a biocide agent (Biopol SMV Chemipol) and 1,000 ppm of an anti-foaming agent (Tego 1488 Evonik). A composition is obtained consisting of 20% by mass of compound according to the invention, 5% by mass of surfactant and 75% by mass of water.

Example 1-2: Preparation of a Compound Tb1 According to the Invention

In a 3 L glass reactor equipped with a mechanical stirring rod, a vacuum pump, and a nitrogen inlet and heated by means of a double jacket in which oil circulates, 448.7 g of a dodecanol/tetradecanol blend ethoxylated with 140 mol of ethylene oxide (MM=6,355 Da) is introduced and heated to 90° C. in an inert atmosphere. This product is dehydrated.

Under stirring and in an inert atmosphere, 6.57 g of dodecanol is rapidly added, then 19.38 g of HDI isocyanurate (mean MM=549 g/mol) is added in one hour in the presence of 200 ppm of a bismuth carboxylate catalyst. When the addition is complete, the reaction mixture is left to stir for 60 minutes at 90° C.±1° C. As described in Example 1-1-1, the absence of isocyanate is checked by back titration. If this number is not zero, the reaction is continued for 15-minute periods until the reaction is completed. When the level reaches zero, the triurethane compound Tb1 obtained is formulated using the surfactant compound, the biocide agent and the anti-foaming agent of example 1-1. The composition obtained consists of 20% by mass of compound according to the invention, 5% by mass of surfactant and 75% by mass of water.

Example 1-3: Preparation of a Compound Tb2 According to the Invention

In a 3 L glass reactor equipped with a mechanical stirring rod, a vacuum pump, and a nitrogen inlet and heated by means of a double jacket in which oil circulates, 348.6 g of a dodecanol/tetradecanol blend ethoxylated with 140 mol of ethylene oxide (MM=6,355 Da) and 82.61 g of dodecanol ethoxylated with 30 mol of ethylene oxide (MM=1,506 g/mol) are introduced and heated to 90° C. in an inert atmosphere. These products are dehydrated.

Under stirring and in an inert atmosphere, 10.20 g of dodecanol is rapidly added, then 30.12 g of HD1 isocyanurate (mean MM=549 g/mol) is added in one hour in the presence of 200 ppm of a bismuth carboxylate catalyst. When the addition is complete, the reaction mixture is left to stir for 60 minutes at 90° C.±1° C. As described in Example 1-1, the absence of isocyanate is checked by back titration. If this number is not zero, the reaction is continued for 15-minute periods until the reaction is completed. When the level reaches zero, the triurethane compound Tb2 obtained is formulated in water with the biocide agent and the anti-foaming agent of example 1-1. The composition obtained consists of 20% by mass of compound according to the invention and 80% by mass of water.

Example 1-4: Preparation of a Compound Tc1 According to the Invention

In a 3 L glass reactor equipped with a mechanical stirring rod, a vacuum pump, and a nitrogen inlet and heated by means of a double jacket in which oil circulates, 415.1 g of a dodecanol/tetradecanol blend ethoxylated with 140 mol of ethylene oxide (MM=6,355 Da) is introduced. This product is dehydrated.

Under stirring and in an inert atmosphere, 24.30 g of dodecanol is rapidly added, then 35.86 g of HDI isocyanurate (mean MM=549 g/mol) is added in one hour in the presence of 200 ppm of a bismuth carboxylate catalyst. When the addition is complete, the reaction mixture is left to stir for 60 minutes at 90° C.±1° C. As described in Example 1-1, the absence of isocyanate is checked by back titration. If this number is not zero, the reaction is continued for 15-minute periods until the reaction is completed. When the level reaches zero, the triurethane compound Tc1 obtained is formulated in water with the biocide agent and the anti-foaming agent of example 1-1. The composition obtained consists of 20% by mass of compound according to the invention and 80% by mass of water.

Example 1-5: Preparation of a Compound Ta2 According to the Invention

In a 3 L glass reactor equipped with a mechanical stirring rod, a vacuum pump, and a nitrogen inlet and heated by means of a double jacket in which oil circulates, 398.9 g of a dodecanol/tetradecanol blend ethoxylated with 140 mol of ethylene oxide (MM=6,355 Da) and of 47.27 g of dodecanol ethoxylated with 30 mol of ethylene oxide (MM=1,506 g/mol) are introduced and heated to 90° C. in an inert atmosphere. This blend is dehydrated.

Under stirring and in an inert atmosphere, 17.23 g of HDI isocyanurate (mean MM=549 g/mol) is then added in one hour in the presence of 200 ppm of a bismuth carboxylate catalyst. When the addition is complete, the reaction mixture is left to stir for 60 minutes at 90° C. 1° C. As described in Example 1-1, the absence of isocyanate is checked by back titration. If this number is not zero, the reaction is continued for 15-minute periods until the reaction is completed. When the level reaches zero, the triurethane compound Ta2 obtained is formulated using the surfactant compound, the biocide agent and the anti-foaming agent of example 1-1. The composition obtained consists of 20% by mass of compound according to the invention, 5% by mass of surfactant and 75% by mass of water.

Example 1-6: Preparation of a Compound Ta3 According to the Invention

In a 3 L glass reactor equipped with mechanical stirring rod, a vacuum pump, and a nitrogen inlet and heated by means of a double jacket in which oil circulates, 440.6 g of ethoxylated tristyryl phenol is introduced with 130 mol of ethylene oxide (MM=6,120 Da) that is heated to 90° C. in an inert atmosphere. This product is dehydrated.

Under stirring and in an inert atmosphere, 13.17 g of HDI isocyanurate (mean MM=549 g/mol) is then added in one hour in the presence of 200 ppm of a bismuth carboxylate catalyst. When the addition is complete, the reaction mixture is left to stir for 60 minutes at 90° C.±1° C. As described in Example 1-1, the absence of isocyanate is checked by back titration. If this number is not zero, the reaction is continued for 15-minute periods until the reaction is completed. When the level reaches zero, the triurethane compound Ta3 obtained is formulated in water with the biocide agent and the anti-foaming agent of example 1-1. The composition obtained consists of 20% by mass of compound according to the invention and 80% by mass of water.

Example 1-7: Preparation of a Compound Ta4 According to the Invention

In a 3 L glass reactor equipped with a mechanical stirring rod, a vacuum pump, and a nitrogen inlet and heated by means of a double jacket in which oil circulates, 440.6 g of a dodecanol/tetradecanol blend ethoxylated with 130 mol of ethylene oxide (MM=6,355 Da) is introduced and heated to 90° C. in an inert atmosphere. This product is dehydrated.

Under stirring and in an inert atmosphere, 13.02 g of HDI biuret (mean MM=549 g/mol) are then added in one hour in the presence of 200 ppm of a bismuth carboxylate catalyst. When the addition is complete, the reaction mixture is left to stir for 60 minutes at 90° C.±1° C. As described in Example 1-1, the absence of isocyanate is checked by back titration. If this number is not zero, the reaction is continued for 15-minute periods until the reaction is completed.

When the level reaches zero, the triurethane compound Ta4 obtained is formulated using the surfactant compound, the biocide agent and the anti-foaming agent of example 1-1. The composition obtained consists of 20% by mass of compound according to the invention, 5% by mass of surfactant and 75% by mass of water.

Example 1-8: Preparation of a Compound Ta5 According to the Invention

In a 3 L glass reactor equipped with a mechanical stirring rod, a vacuum pump, and a nitrogen inlet and heated by means of a double jacket in which oil circulates, 301.1 g of a dodecanol/tetradecanol blend ethoxylated with 140 mol of ethylene oxide (MM=6,355 Da) and 142.71 g of dodecanol ethoxylated with 30 mol of ethylene oxide (MM=1,506 g/mol) are introduced and heated to 90° C. in an inert atmosphere. This blend is dehydrated.

Under stirring and in an inert atmosphere, 26.01 g of HDI isocyanurate (mean MM 549 g/mol) is then added in one hour in the presence of 200 ppm of a bismuth carboxylate catalyst. When the addition is complete, the reaction mixture is left to stir for 60 minutes at 90° C.±1° C. As described in Example 1-1, the absence of isocyanate is checked by back titration. If this number is not zero, the reaction is continued for 15-minute periods until the reaction is completed. When the level reaches zero, the triurethane compound Ta5 obtained is formulated using the surfactant compound, the biocide agent and the anti-foaming agent of example 1-1. The composition obtained consists of 20% by mass of compound according to the invention, 5% by mass of surfactant and 75% by mass of water.

Example 2: Preparation of Paint Formulations According to the Invention

Paint formulations F1 to F6 according to the invention are prepared from aqueous compositions of triurethane compound according to the invention. All of the ingredients and proportions (% by mass) used are listed in Table 1.

TABLE 1

| Ingredients | Quantity (g) |
|---|---|
| Water | 99.7 |
| Dispersing agent (Coadis BR3 Coatex) | 3.9 |
| Biocide agent (Acticide MBS Thor) | 1.3 |
| Anti-foaming agent (Airex 901W Evonik) | 1.31 |
| $NH_4OH$ (28%) | 0.6 |
| $TiO_2$ pigment (RHD2 Huntsman | 122.2 |
| $CaCO_3$ pigment (Omyacoat 850 OG Omya) | 84.6 |
| Binding agent (Acronal S790 Basf) | 270.7 |
| Monopropylene glycol | 6.5 |
| Solvent (Texanol Eastman) | 6.5 |
| Anti-foaming agent (Tego 825 Evonik) | 1 |
| Aqueous composition 1 according to the invention | 28.7 |
| Added water | q.s.p 650 total |

Example 3: Characterization of Paint Formulations According to the Invention

For the paint formulations according to the invention, the Brookfield viscosity, measured at 25° C. and at 10 rpm and 100 rpm ($\mu_{Bk10}$ and $\mu_{Bk100}$ in mPa·s) was determined 24 hours after their preparation using a Brookfield DV-1 viscometer with RV spindles.

The properties of the paint formulations are listed in Table 2.

TABLE 2

| Formulation | Compound | $\mu_{Bk10}$ | $\mu_{Bk100}$ |
|---|---|---|---|
| F1 | Ta1 | 3620 | 2108 |
| F2 | Tb1 | 7480 | 2956 |
| F3 | Ta3 | 2050 | 1159 |
| F4 | Ta5 | 6820 | 3456 |
| F5 | Tc1 | 14200 | 5355 |
| F6 | Ta4 | 15900 | 8605 |

The triurethane compounds according to the invention are highly effective in obtaining excellent low and medium shear gradient viscosities for paint compositions.

Example 4: Characterization of Paint Formulations According to the Invention

For the paint formulations according to the invention, the Cone Plan viscosity or ICI viscosity, measured at high shear gradient (μI in mPa·s) was determined 24 hours after their preparation and at room temperature, using a Cone & Plate Research Equipment London (REL) viscometer having a measuring range of 0 to 5 poise, and the Stormer viscosity, measured at medium shear gradient (μS in Krebs Units or KUs), was determined using the reference module of a Brookfield KU-2 viscometer. The properties of the paint formulations are listed in Table 3

TABLE 3

| Formulation | Composition | $\mu_I$ | $\mu_S$ | $\mu_I/\mu_S$ |
|---|---|---|---|---|
| F1 | Ta1 | 350 | 103 | 3.4 |
| F2 | Tb1 | 315 | 109 | 2.9 |
| F3 | Ta3 | 245 | 87 | 2.8 |
| F4 | Ta5 | 280 | 116 | 2.4 |

The triurethane compounds according to the invention make it possible to prepare paint formulations with particularly well-controlled viscosities. In particular, the $\mu_I$ viscosity is particularly high and the $\mu_I/\mu_S$ ratio is therefore excellent. The compounds according to the invention allow for an excellent compromise between high shear gradient viscosity and low shear gradient viscosity.

The invention claimed is:

1. A triurethane compound, prepared by reacting:

a. one molar equivalent of at least one polyisocyanate compound (a) comprising on average three isocyanate groups; and b. one molar equivalent of at least one polyalkoxylated compound (b) comprising (b1) a straight aliphatic monoalcohol, comprising from 6 to 40 carbon atoms, that is polyalkoxylated, (b2) a branched aliphatic monoalcohol, comprising from 6 to 40 carbon atoms, that is poly alkoxylated, (b3) a cycloaliphatic monoalcohol, comprising from 6 to 40 carbon atoms, that is polyalkoxylated, (b4) a monoaromatic monoalcohol, comprising from 6 to 30 carbon atoms, that is polyalkoxylated, and/or (b5) a polyaromatic monoalcohol, comprising from 10 to 80 carbon atoms, that is polyalkoxylated, and c. two molar equivalents of at least two identical or different compounds (c) comprising (c1) a straight aliphatic monoalcohol, comprising from 6 to 40 carbon atoms, that is polyalkoxylated, (c2) a branched aliphatic monoalcohol, comprising from 6 to 40 carbon atoms, that is polyalkoxylated, (c3) a cycloaliphatic monoalcohol, comprising from 6 to 40 carbon atoms, that is polyalkoxylated, (c4) a monoaromatic monoalcohol, comprising from 6 to 30 polyalkoxylated carbon atoms, that is polyalkoxylated, (c5) a polyaromatic monoalcohol comprising from 10 to 80 carbon atoms, that is polyalkoxylated, (c6) a straight aliphatic monoalcohol comprising from 6 to 40 carbon atoms, that is non-alkoxylated, (c7) a branched aliphatic monoalcohol, comprising from 6 to 40 carbon atoms, that is non-alkoxylated, (c8) a cycloaliphatic monoalcohol, comprising from 6 to 40 carbon atoms, that is non-alkoxylated, (c9) a monoaromatic monoalcohol, comprising from 6 to 30 carbon atoms, that is non-alkoxylated, and/or (c10) a polyaromatic monoalcohol, comprising from 10 to 80 carbon atoms, that is non-alkoxylated.

2. The triurethane compound of claim 1, prepared by reacting:

a. one molar equivalent of the at least one triisocyanate compound (a); and b. one molar equivalent of the at least one polyalkoxylated compound (b) comprising (b1) the straight aliphatic monoalcohol, comprising from 6 to 40 carbon atoms, that is polyalkoxylated, (b2) the branched aliphatic monoalcohol, comprising from 6 to 40 carbon atoms that is polyalkoxylated, (b3) the cycloaliphatic monoalcohol, comprising from 6 to 40 carbon atoms, that is polyalkoxylated, (b4) the monoaromatic monoalcohol, comprising from 6 to 30 carbon atoms, that is polyalkoxylated, and/or (b5) the polyaromatic monoalcohol, comprising from 10 to 80 carbon atoms, that is polyalkoxylated, and c. two molar equivalents of the at least one identical or different polyalkoxylated compound (c) comprising (c1) the straight aliphatic monoalcohol, comprising from 6 to 40 carbon atoms that is polyalkoxylated, (c2) the branched aliphatic monoalcohol, comprising from 6 to 40 carbon atoms, that is polyalkoxylated, (c3) the cycloaliphatic monoalcohol, comprising from 6 to 40 carbon atoms, that is polyalkoxylated, (c4) the monoaromatic monoalcohol, comprising from 6 to 30 carbon atoms, that is polyalkoxylated, and/or (c5) the polyaromatic monoalcohol, comprising from 10 to 80 carbon atoms, that is polyalkoxylated.

3. The triurethane compound of claim 1, prepared by reacting:

a. one molar equivalent of the at least one triisocyanate compound (a); and b. one molar equivalent of the at least one polyalkoxylated compound (b) comprising (b1) the straight aliphatic monoalcohol, comprising from 6 to 40 carbon atoms, that is polyalkoxylated, (b2) the branched aliphatic monoalcohol, comprising from 6 to 40 carbon atoms, that is polyalkoxylated, (b3) the cycloaliphatic monoalcohol, comprising from 6 to 40 carbon atoms, that is polyalkoxylated, (b4) the monoaromatic monoalcohol, comprising from 6 to 30 carbon atoms, that is polyalkoxylated, and/or (b5) the polyaromatic monoalcohol, comprising from 10 to 80 carbon atoms, that is polyalkoxylated; and c. one molar equivalent of the at least one identical or different polyalkoxylated compound (c), comprising (c1) the straight aliphatic monoalcohol, comprising from 6 to 40 carbon atoms, that is polyalkoxylated, (c2) the branched aliphatic monoalcohol, comprising from 6 to 40 carbon atoms, that is polyalkoxylated, (c3) a cycloaliphatic monoalcohol, comprising from 6 to 40 carbon atoms, that is polyalkoxylated, (c4) a monoaromatic monoalcohol, comprising from 6 to 30 carbon atoms, that is polyalkoxylated, and/or (c5) a polyaromatic monoalcohol, comprising from 10 to 80 carbon atoms, that is polyalkoxylated, and one molar equivalent of the at least one identical or different non-alkoxylated compound (c), comprising (c6) the straight aliphatic monoalcohol, comprising from 6 to 40 carbon atoms, that is non-alkoxylated, (c7) the branched aliphatic monoalcohol, comprising from 6 to 40 carbon atoms, that is non-alkoxylated, (c8) the cycloaliphatic monoalcohol, comprising from 6 to 40 carbon atoms, that is non-alkoxylated, (c9) the monoaromatic monoalcohol, comprising from 6 to 30 carbon atoms, that is non-alkoxylated, and/or (c10) the poly aromatic monoalcohol, comprising from 10 to 80 carbon atoms, that is non-alkoxylated.

4. The triurethane compound of claim 1, prepared by reacting:

a. one molar equivalent of the at least one triisocyanate compound (a); and b. one molar equivalent of the at least one identical or different polyalkoxylated compound (b), comprising (b1) the straight aliphatic monoalcohol, comprising from 6 to 40 carbon atoms, that is polyalkoxylated, (b2) the branched aliphatic, monoalcohol comprising from 6 to 40 carbon atoms, that is polyalkoxylated, (b3) the cycloaliphatic monoalcohol, comprising from 6 to 40 carbon atoms, that is poly alkoxylated, (b4) the monoaromatic monoalcohol, comprising from 6 to 30 carbon atoms, that is polyalkoxylated, and/or (b5) the polyaromatic monoalcohol, comprising from 10 to 80 carbon atoms, that is polyalkoxylated, and c. two molar equivalents of the at least one identical or different non-alkoxylated compound (c), comprising (c6) the straight aliphatic monoalcohol, comprising from 6 to 40 carbon atoms, that is non-alkoxylated, (c7) the branched aliphatic monoalcohol, comprising from 6 to 40 carbon atoms, that is non-alkoxylated, (c8) the cycloaliphatic monoalcohol, comprising from 6 to 40 carbon atoms, that is non-alkoxylated, (c9) the monoaromatic monoalcohol, comprising from 6 to 30 carbon atoms, that is non-alkoxylated, and/or (c10) the polyaromatic monoalcohol, comprising from 10 to 80 carbon atoms, that is non-alkoxylated.

5. The triurethane compound of claim 1, wherein the reaction uses a single compound (a) or uses two or three different compounds (a), or wherein the compound (a) comprises:

triphenylmethane-4,4',4"-triisocyanate or 1,1',1"-methylidynetris (4-isocyanatobenzene);

an isocyanurate compound; and/or a biuret trimer compound.

6. The triurethane compound of claim 1, wherein the compound (a) comprises an IPDI isocyanurate, a PDI isocyanurate, an HDI biuret trimer, an IPDI biuret trimer, a PDI biuret trimer, or a combination thereof.

7. The triurethane compound of claim 1, having a degree of polyalkoxylation in a range of from 100 to 500, or wherein the polyalkoxylated monoalcohol comprises from 2 to 500 alkoxy groups, or wherein alkoxy groups are $—CH_2CH_2O—$, $—CH_2CH(CH_3)O—$, $—CH(CH_3)CH_2O—$, $—CH(CH_2CH_3)CH_2—O—$, $—CH_2CH(CH_2CH_3)O—$ or a combination thereof.

8. The triurethane compound of claim 1, wherein a hydrocarbon chain of the monoalcohol (b1) comprises from 6 to 30 carbon atoms, or wherein one or more straight polyalkoxylated aliphatic monoalcohols (b1) are used to prepare the triurethane compound and comprise from 80 to 500 alkoxy groups, or wherein a hydrocarbon chain of the monoalcohol (b2) comprises from 6 to 30 carbon atoms, or wherein a hydrocarbon chain of the monoalcohol (b3) comprises from 6 to 30 carbon atoms, or wherein a hydrocarbon chain of the monoalcohol (b4) comprises from 12 to 30 carbon atoms, or wherein the monoaromatic polyalkoxylated alcohol (b4) is used to prepare the triurethane compound and comprises from 6 to 12 carbon atoms, or wherein a hydrocarbon chain of the monoalcohol (b5) comprises from 10 to 60 carbon atoms.

9. The triurethane compound of claim 1, wherein a hydrocarbon chain of the monoalcohol (c1) comprises from 6 to 30 carbon atoms, or wherein a hydrocarbon chain of the monoalcohol (c2) comprises from 6 to 30 carbon atoms, or wherein a hydrocarbon chain of the monoalcohol (c3) comprises from 6 to 30 carbon atoms, or wherein a hydrocarbon chain of the monoalcohol (c4) comprises from 12 to 30 carbon atoms, or wherein a hydrocarbon chain of the monoalcohol (c5) comprises from 10 to 60 carbon atoms, or wherein a hydrocarbon chain of the monoalcohol (c6) comprises from 6 to 30 carbon atoms, or wherein one or more straight non-alkoxylated aliphatic monoalcohols (c6) are used to prepare the triurethane compound and comprise from 16 to 40 carbon atoms, or wherein a hydrocarbon chain of the monoalcohol (c7) comprises from 6 to 30 carbon atoms, or wherein a hydrocarbon chain of the monoalcohol (c8) comprises from 6 to 30 carbon atoms, or wherein a hydrocarbon chain of the monoalcohol (c9) comprises from 12 to 30 carbon atoms, or wherein a hydrocarbon chain of the monoalcohol (c10) comprises from 10 to 60 carbon atoms.

10. A method for preparing a triurethane compound, the method comprising:

reacting a. one molar equivalent of at least one polyisocyanate compound (a) comprising on average three isocyanate groups; and b. one molar equivalent of at least one polyalkoxylated compound (b) comprising (b1) a straight aliphatic monoalcohol, comprising from 6 to 40 carbon atoms, that is polyalkoxylated, (b2) a branched aliphatic monoalcohol, comprising from 6 to 40 carbon atoms, that is polyalkoxylated, (b3) a cycloaliphatic monoalcohol, comprising from 6 to 40 carbon atoms, that is polyalkoxylated, (b4) a monoaromatic monoalcohol, comprising from 6 to 30 carbon atoms, that is polyalkoxylated, and/or (b5) a polyaromatic monoalcohol, comprising from 10 to 80 carbon atoms, that is polyalkoxylated, and c. two molar equivalents of at least two identical or different compounds (c) comprising (c1) a straight aliphatic monoalcohol, comprising from 6 to 40 carbon atoms, that is polyalkoxylated, (c2) a branched aliphatic monoalcohol, comprising from 6 to 40 carbon atoms, that is polyalkoxylated, (c3) a cycloaliphatic monoalcohol, comprising from 6 to 40 carbon atoms, that is polyalkoxylated, (c4) a monoaromatic monoalcohol, comprising from 6 to 30 carbon atoms, that is polyalkoxylated, (c5) a polyaromatic monoalcohol, comprising from 10 to 80 carbon atoms, that is polyalkoxylated, (c6) a straight aliphatic monoalcohol, comprising from 6 to 40 carbon atoms, that is polyalkoxylated, (c7) a branched aliphatic monoalcohol, comprising from 6 to 40 carbon atoms, that is non-alkoxylated, (c8) a cycloaliphatic, monoalcohol comprising from 6 to 40 carbon atoms, that is non-alkoxylated, (c9) a monoaromatic monoalcohol, comprising from 6 to 30 carbon atoms, that is non-alkoxylated, and/or (c10) a polyaromatic monoalcohol, comprising from 10 to 80 carbon atoms, that is non-alkoxylated.

11. A method of preparing the triurethane compound of claim 1, the method comprising:

reacting the one molar equivalent of the at least one polyisocyanate compound (a), the one molar equivalent of the at least one polyalkoxylated compound (b), and the two the molar equivalents of the at least two identical or different compounds (c).

12. An aqueous composition, comprising:

the triurethane compound of claim 1, and optionally an amphiphilic compound;

a polysaccharide derivative;

a solvent;

anti-foaming agent; and/or a biocide agent.

13. An aqueous formulation, comprising:

the composition of claim 12; and optionally an organic pigment, mineral pigment, organic particles, organo-metallic particles, or mineral particles; and optionally a particle-spacer agent, a dispersing agent, a stabilizing steric agent, an electrostatic stabilizer agent, an opacifying agent, a solvent, a coalescing agent, an anti-foaming agent, a preservative agent, a biocide agent, a spreading agent, a thickening agent, a film-forming copolymer, or a mixture thereof.

14. The formulation of claim 13, which is a coating formulation.

15. A concentrated, water-based pigment pulp, comprising:

the triurethane compound of claim 1; and a colored organic or mineral pigment.

16. A method for controlling the viscosity of an aqueous composition, the method comprising:

adding at least one of the triurethane compound T of claim 1.

17. The method of claim 16, in which the aqueous composition is a composition comprising the triurethane compound T, and optionally an amphiphilic compound;

a poly saccharide derivative;

a solvent;

anti-foaming agent; and/or a biocide agent.

18. The triurethane compound of claim 1, wherein the compound (a) comprises triphenylmethane-4,4',4"-triisocyanate.

19. The triurethane compound of claim 1, wherein the compound (a) comprises 1,1',1"-methylidynetris (4-isocyanatobenzene).

20. The triurethane compound of claim 1, wherein the compound (a) comprises an HDI isocyanurate.

* * * * *